United States Patent [19]

Bucher et al.

[11] Patent Number: 4,694,334
[45] Date of Patent: Sep. 15, 1987

[54] PYROELECTRIC CAMERA SIGNAL PROCESSING HAVING PEDESTAL SIGNAL LEVEL COMPENSATION

[75] Inventors: Hans R. Bucher, Boulder; Donald E. Hodd, Niwot, both of Colo.

[73] Assignee: Xedar Corporation, Boulder, Colo.

[21] Appl. No.: 813,011

[22] Filed: Dec. 24, 1985

[51] Int. Cl.⁴ .............................................. H04N 5/33
[52] U.S. Cl. .................................. 358/113; 358/163; 250/333
[58] Field of Search ................ 358/113, 163; 250/333, 250/334

[56] References Cited

U.S. PATENT DOCUMENTS 4,481,535 11/1984 Hodd .................................. 358/113

Primary Examiner—Howard W. Britton
Attorney, Agent, or Firm—Robert E. Harris

[57] ABSTRACT

A system and method are disclosed for pyroelectric camera signal processing, which processing includes compensating for the effects of pedestal level variations. The pyroelectric videcon tube generates an electrical output signal component indicative of target signal information based upon the sensed thermal energy emitted from the target, and also generates a pedestal component around which the target signal information is centered. A line-by-line DC restorer is provided to re-establish the DC level of the video signal, with the DC level of the restorer being automatically controlled to thereby compensate for variations in pedestal levels due to drift, tube aging, and/or generated by shutter to scene temperature differences.

18 Claims, 3 Drawing Figures

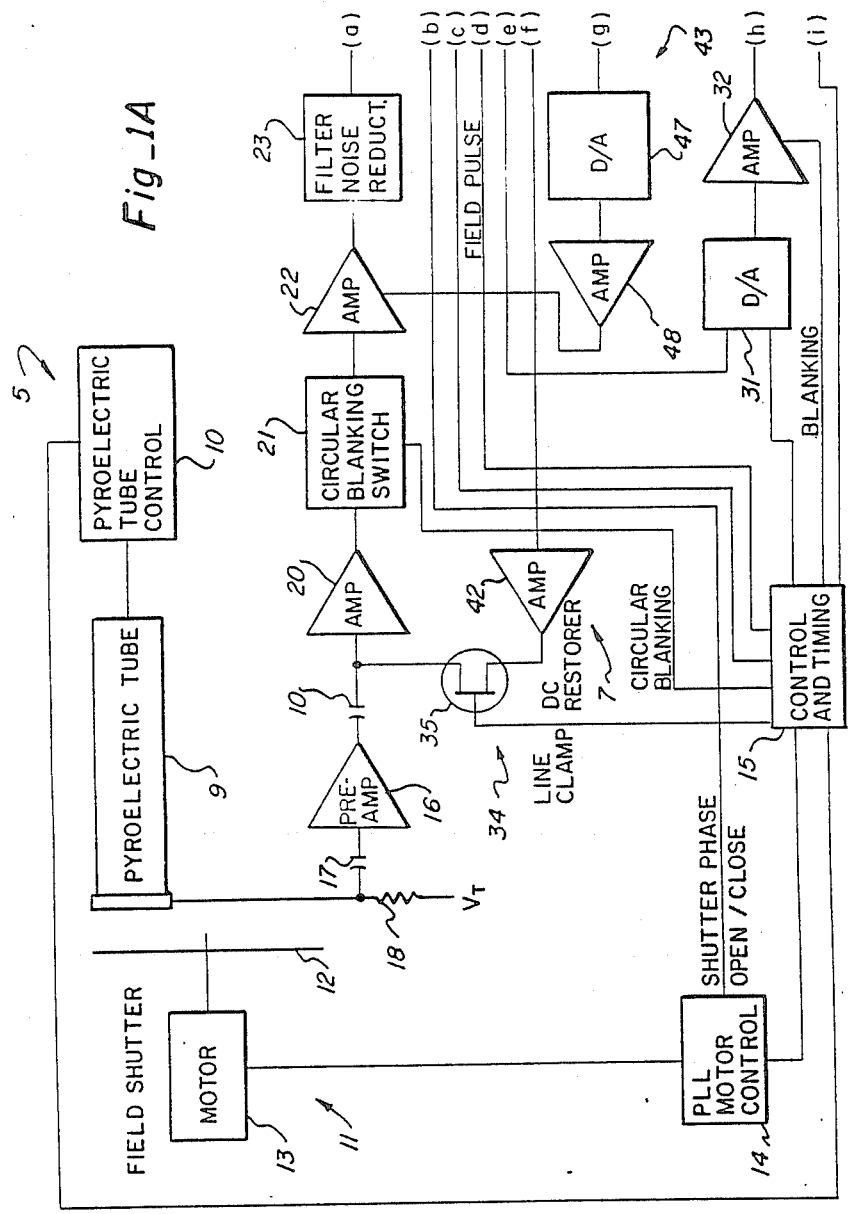

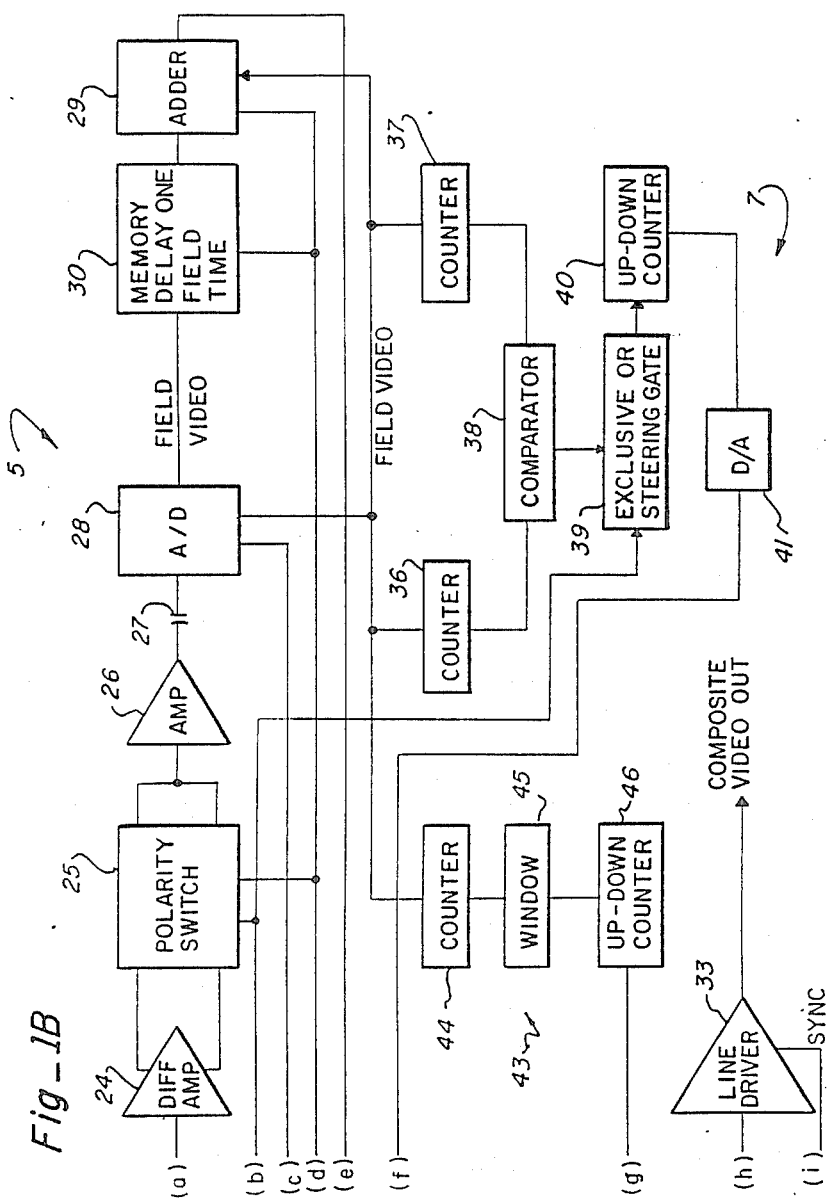
Fig_1B

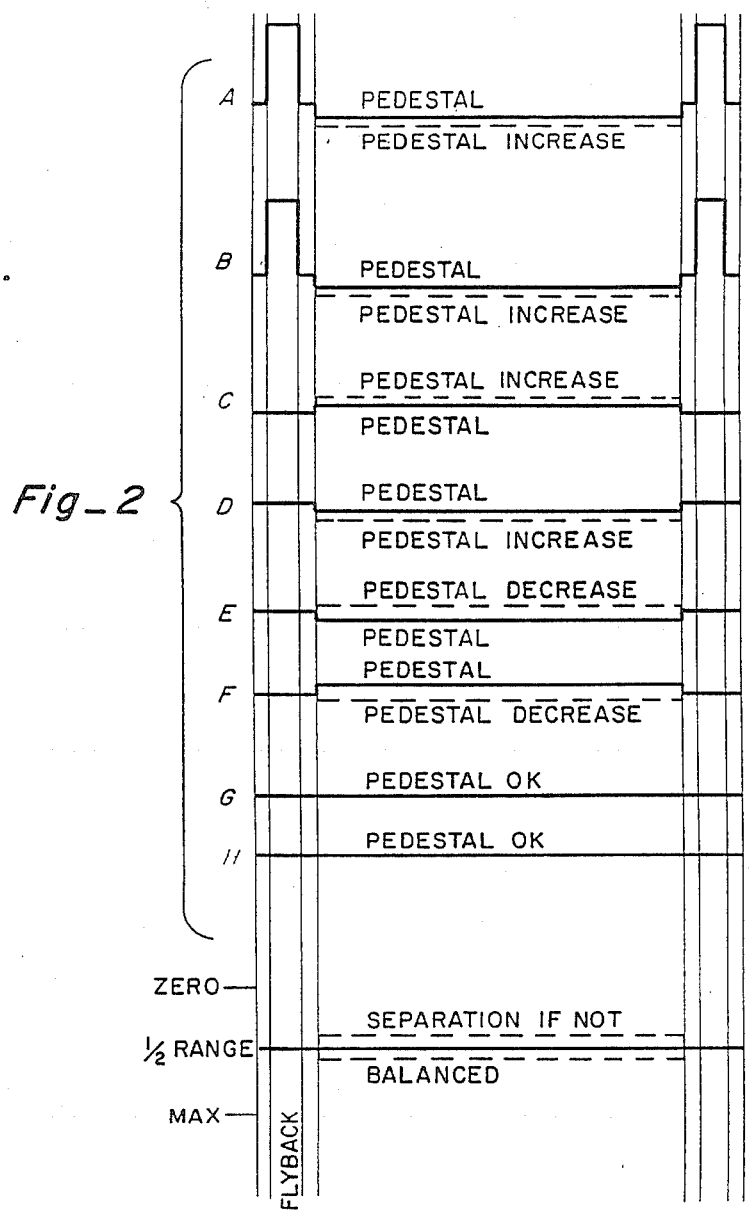

PYROELECTRIC CAMERA SIGNAL PROCESSING HAVING PEDESTAL SIGNAL LEVEL COMPENSATION

FIELD OF THE INVENTION

This invention relates to pyroelectric camera signal processing and, more particularly, relates to pyroelectric camera signal processing having pedestal signal level compensation.

BACKGROUND OF THE INVENTION

As is well known, a pyroelectric camera is basically a television camera that is capable of producing an infrared television picture. A pyroelectric videcon tube is utilized as the input of the pyroelectric camera to sense a thermal image of the target by receiving thermal energy emitted by the target and provides an electrical output signal indicative thereof, which electrical signal output is then processed by associated electronic circuitry to provide a composite video output signal.

In order to reduce the readout lag and to be able to read out the positive and negative information from the target of a pyroelectric videcon tube, it is required that the tube be operated in a mode so as to establish a pedestal component around which the signal information from the videcon tube is centered. The pedestal component is normally generated either by secondary emission (by means of pulsing the thermionic cathode and $G_1$ negative during flyback) or is generated by means of ionizing $H_2$ gas (during flyback of the reading beam). While either method may be employed in pyroelectric camera systems, both approaches have been found to suffer from stability problems encountered in the amplitude of the generated pedestal level and the effects it has on the output signal and image quality obtained.

A change in pedestal amplitude can cause severe flicker, which flicker occurs at the field rate of the system if analog signal processing is employed, and pedestal level changes can also lead to signal processing amplifier saturation which renders the system useless.

The pedestal level in a pyroelectric camera is influenced by several factors including the cathode pulse amplitude, the beam control grid ($G_1$) pulse amplitude, and the thermionic cathode. The cathode pulse and the $G_1$ pulse amplitudes are circuit parameters, and the thermionic cathode characteristic is controlled in manufacture of the camera tube and changes over the life of the camera tube.

If ionization is employed, the gas pressure will greatly influence the pedestal level, and, again, the characteristic of the gas reservoir and the thermionic cathode will change with tube life.

Different systems and methods have been proposed to stabilize the pedestal level of camera tubes either by monitoring the gird current in the tube and by using its magnitude to control the pedestal level, or by monitoring the grid current in using its magnitude to adjust the hydrogen pressure which then controls the pedestal level.

It has been found, however, that known control systems and methods are difficult to implement and have been found to be only partially effective. In addition, these systems and methods do not provide compensation for the undesirable pedestal level shift generated by the temperature difference between the shutter temperature and the average scene temperature. This temperature difference manifests itself as a DC-pedestal shift which again will cause flicker, limited dynamic range, and/or possibly amplifier saturation and loss of the image.

It has also heretofore been found that the effect of pedestal level fluctuations can be corrected within limited levels at the cost of the available dynamic range, with a signal processing system for accomplishing this end being shown in our U.S. Pat. No. 4,481,535.

SUMMARY OF THE INVENTION

This invention provides a system and method for pyroelectric camera signal processing which includes compensating for the effects of pedestal component level variations. The system and method compensates for variations in pedestal levels due to drift and tube aging, and eliminates the effects on the pedestal level due to temperature differences between the shutter and the scene average temperature. In accomplishing such compensation, the DC level of a line-by-line DC restorer is controlled through use of a feedback circuit that includes digital components with the circuitry being fully self-optimizing.

It is therefore an object of this invention to provide an improved system and method for pyroelectric camera signal processing that includes pedestal level signal compensation.

It is still another object of this invention to provide an improved system and method for processing pyroelectric camera signals by controlling a DC restorer.

It is still another object of this invention to provide an improved system and method for achieving pedestal component level compensation in a pyroelectric camera utilizing a feedback circuit having digital components.

It is still another object of this invention to provide a system and method for pyroelectric camera signal processing that is fully self-optimizing.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical applications of the principles thereof, and in which:

FIGS. 1A and 1B, taken together, form a block diagram of the signal processing system of this invention having pedestal component level compensation incorporated therein; and FIGS. 2A through 2H are typical waveform presentations illustrating operation of the system as shown in FIGS. 1A and 1B.

DESCRIPTION OF THE INVENTION

The pyroelectric camera signal processing system 5 of this invention is shown in the block diagrams of FIGS. 1A and 1B to include compensation circuitry 7. While the pyroelectric camera particularly shown in FIGS. 1A and 1B is a chopper-type video camera, the signal processing system utilizing compensating circuitry, as shown and described herein, is not meant to be restricted to the particular type pyroelectric camera illustrated, although being particularly well suited therefor. In addition, since pyroelectric cameras are known, the details of such cameras have been included herein only to the extent deemed necessary to illustrate the invention.

A signal processing system for a chopper-type pyroelectric camera is shown and described in our U.S. Pat. No. 4,481,535, issued Mar. 6, 1984, and assigned to the Assignee of this invention. This invention is based upon the system shown in U.S. Pat. No. 4,481,535, and this patent is hereby included by reference herein.

Signal processing system 5, as shown in FIG. 1A, includes a pyroelectric videcon tube 9 which receives thermal energy emitted from a target (not shown) along an optical path extending from the target to the tube. As indicated, pyroelectric videcon tube 9 is conventionally controlled by pyroelectric tube control unit 10.

In order for pyroelectric videcon tube 9 to sense steady-state thermal information, a chopper assembly 11 is provided, which assembly causes tube 9 to receive thermal information and generate an electrical output signal indicative thereof even though the information is not dynamic in nature.

As indicated in FIG. 1A, chopper assembly 11 may conventionally include a chopper wheel 12 that is rotated by motor 13 controlled by phase lock loop (PLL) motor control unit 14. PLL motor control unit 14 is, in turn, controlled by control and timing circuitry 15 conventionally found in the pyroelectric camera (circuitry 15 also controls pyroelectric tube control unit 10) so that the shutter edge is maintained in alignment with the tube reading beam on a field-to-field basis. In other words, the shutter is caused to rotate to alternately provide first and second fields, with the rotation being at a speed such that during each first field the camera is imaging the target and during each second field the shutter (which is opaque to infrared) blocks passage of the infrared to the pyroelectric videcon tube.

As also shown in FIG. 1A, the output signal from pyroelectric videcon tube 9 is couple to preamplifier 16 through capacitor 17 one side of which has a resistor 18 connected with the $V_T$ power supply. The output signal from preamplifier 16 is coupled through capacitor 19 to amplifier 20 the output of which is coupled through circular blanking switch 21 to amplifier 22.

After amplification by amplifier 22, the signal is coupled through noise reduction filter 23 to differential output amplifier 24 (shown in FIG. 1B). Differential amplifier 24 is connected with polarity switch 25 which is controlled by the field rate pulse (from control and timing unit 15) and the shutter position pulse (shutter open or closed) (from PLL-motor control unit 14) to select the video signal on a field-to-field basis such that a unity polarity signal is obtained.

In order to add the two fields, one of the fields must be delayed for one field time after which the two field are added. As shown in FIG. 1B, this is accomplished digitally by coupling the output signal from amplifier 26 through capacitor 27 to analog-to-digital (A/D) converter 28 one output of which is coupled to adder 29 and the other output of which is coupled to digital memory unit 30 for delaying the field video by one field time after which the memory unit output is coupled to adder 29.

The output signal from adder 29 is coupled through digital-to-analog (D/A) converter 31 (shown in FIG. 1A) to again provide an analog signal output. By so doing, the first field signal and the second field signal, the third field signal and the fourth field signal, etc. will be added. As indicated in FIGS. 1A and 1B, analog-to-digital converter 28, adder 29, memory 30, and digital-to-analog converter 31 are all controlled by outputs from control and timing unit 15.

The analog output signal from digital-to-analog signal converter 31 is then further amplified by amplifier 32 and then conditioned into a composite video signal by adding blanking and sync from control and timing unit 15 at amplifier 32 and line driver 33, respectively.

As also shown in FIGS. 1A and 1B, compensation circuitry 7 is a feedback circuit that functions with DC restorer circuit 34. As shown in FIG. 1A, DC restorer unit 34 includes field effect transistor (FET) 35 which receives a line clamp input from control and timing unit 15, and provides an output to amplifier 20.

As shown in FIG. 1B, compensation circuitry 7 includes counters 36 and 37 which receive digital outputs from A/D converter 28. The analog input DC level is set to the mid-range input level of A/D converter 28 to maximize the useful dynamic range since the signal generated by the thermal scene is centered about the DC-pedestal level set at the A/D converter input. Counter 36 counts the times that most significant bits (MSBs) are present in the field and counter 37 counts the times that the least significant bits (LSBs) are present in the same field.

The outputs from counters 36 and 37 are coupled to comparator 38, the output of which is coupled through EXCLUSIVE OR steering gate 39 to up-down counter 40. The polarity of the comparator output is reversed by EXCLUSIVE OR gate 39, which gate receives an input from timing control 15 so that gate 39 is controlled by the timing based on the expected video polarity. The output from counter 40 is then coupled to D/A converter 41. Comparator 38 compares the two counts from counters 36 and 37 and, depending upon the presence of the number of MSBs or LSBs in each field, causes up-down counter 40 to adjust the level of DC restorer 34. As shown in FIGS. 1A and 1B, the analog output from D/A converter 41 is coupled through amplifier 42, the output of which provides an input to field effect transistor 35 of DC restorer unit 34. Using this method, the pedestal level will always be zeroed at one-half the range level of the input of A/D converter 28 regardless of scene content.

During the line flyback of the deflection, a pedestal current on the target must be generated by secondary emission in the target in order for the pyroelectric videcon to function properly. This is conventionally accomplished by pulsing the cathode potential sufficiently negative during flyback in response to the target potential while, at the same time, pulsing the beam control grid ($G_1$) of the pyroelectric videcon tube to control the amount of secondary electron current. In order to stabilize the operation of the pyroelectric videcon tube, it is also necessary to overscan the tube target, which creates a circular image. A typical pedestal signal generated by pyroelectric camera tube 9 is shown in FIGS. 2A and 2B (first and second fields, respectively).

The nominal pedestal level can shift so as to be increasing or decreasing due to slight amplitude changes in the cathode pulse or $G_1$, due to changes in the thermionic cathode, due to tube aging, and/or due to the temperature difference between the shutter and the scene ambient.

Circular blanking switch 21, in conjunction with the DC-pedestal of line clamp restorer unit 34, eliminates the pedestal generating signal during flyback and, depending on the DC-level of restorer unit 34, the first field signal (shown typically in FIG. 2C) or the second field signal (shown typically in FIG. 2D) illustrates how a line is obtained. By changing the DC-level of restorer unit 34, a signal, such as shown in FIG. 2E, can be obtained relative to a signal, such as shown in FIG. 2F. By adjusting the DC-level to the correct potential, the optimum condition, such as shown in FIG. 2G can be obtained relative to that shown in FIG. 2H.

Hence, by controlling the DC-level of the line-by-line restorer unit 34, compensation can be automatically made for changes in pedestal level due to drift, tube aging, and/or generated by shutter temperature to scene temperature differences.

An automatic gain control circuit 43 is also provided that is independent of feedback circuitry 7. Gain control circuit 43 (shown in FIG. 1B) includes a counter 44 connected to receive an output from A/D converter 28. Counter 44 counts the number of times the overflow of A/D converter 28 is encountered in a field. The output from counter 44 is coupled through window 45, which window controls the state of up-down counter 46 and checks the signal level to as high, proper, or low. Depending upon the situation encountered, the up-down counter 46 is activated accordingly, and D/A converter 47 (shown in FIG. 1A) and amplifier 48 automatically controls the gain of processing amplifier 22.

As can be appreciated from the foregoing, this invention provides an improved signal processing system and method having pedestal level component compensation with the circuitry being fully self-optimizing.

What is claimed is:

1. A signal processing system for a pyroelectric camera having a pyroelectric videcon tube, said system comprising:
    input means for receiving the output signal from said pyroelectric videcon tube, which output signal includes a pedestal component; and
    processing means including signal path establishing means having amplifying means connected with said input means to receive said output signal therefrom and analog-to-digital converter means connected with said amplifying means, said signal processing means also including DC restorer means connected with said amplifying means and feedback means the input of which is connected with said analog-to-digital converter means to receive digital outputs therefrom and the output of which is connected with said DC restorer means to thereby automatically compensate for variations in the level of said pedestal components.

2. The system of claim 1 wherein said feedback means includes a digital-to-analog converter means, and wherein said DC restorer means includes a field effect transistor connected to receive the analog output of said digital-to-analog connector means.

3. The system of claim 1 wherein said feedback means includes first and second counter means connected with said analog-to-digital converter means, and comparator means connected with said counter means.

4. The system of claim 3 wherein said first counter means counts most significant bits and said second counter means counts least significant bits.

5. The system of claim 3 wherein said feedback means also includes steering gate means connected with said comparator means and up-down counter means connected with said steering gate means.

6. The system of claim 1 wherein said processing means also includes automatic gain control means independent of said feedback means.

7. The system of claim 6 wherein said automatic gain control means includes counter means.

8. A signal processing system for a pyroelectric camera having a pyroelectric videcon tube and a shutter positionable in the optical path of said pyroelectric videcon tube, said system comprising:
    input means for sensing the output signal from said pyroelectric videcon tube, said output signal having a first field arising from imaging of a target by said pyroelectric videcon tube and a second field arising from blocking of images of a target by said shutter, with said output signal indicative of each said field including pedestal components; and
    processing means including signal path establishing means having amplifying means connected with said input means to receive said output signal therefrom, polarity switching means connected with said amplifying means, and analog-to-digital converter means connected with said polarity switching means, said processing means also including DC restorer means connected with said amplifying means and feedback means connected with said analog-to-digital converter means and said DC restorer means to automatically compensate for variations in the level of said pedestal components.

9. The system of claim 8 wherein said feedback means includes first and second counter means connected with said analog-to-digital converter means, comparator means connected with said first and second counter means, steering gate means connected to receive the output from said comparator means, third counter means connected with said steering gate means, and digital-to-analog converter means connected with said third counter means and said DC restorer means.

10. The system of claim 8 wherein said processing means includes automatic gain control means independent of said feedback means.

11. The system of claim 10 wherein said signal path establishing means includes second amplifying means, and wherein said automatic gain control means includes counter means connected with said analog-to-digital converter means and said second amplifying means.

12. A signal processing system for a pyroelectric camera having a pyroelectric videcon tube and a shutter positionable in the optical path of said pyroelectric videcon tube, said system comprising:
    input means for receiving the output signal from said pyroelectric videcon tube, said output signal including a first field arising from imaging of the target by said pyroelectric videcon and a second field arising from blanking of imaging of a target by said shutter, with said output signals indicative of each said field including pedestal components;
    amplifying means connected with said input means;
    DC restorer means connected with said amplifying means;
    circular blanking means connected with said amplifying means;
    filter noise reduction means connected with said circular blanking means;
    differential amplifying means connected with said filter noise reduction means;

polarity switching means connected with said differential amplifying means for providing a unity output signal with respect to each of said fields;

analog-to-digital converter means connected with said polarity switching means;

feedback means connected to receive an output from said analog-to-digital converter means and connected to provide an input to said DC restorer means, said feedback means including a plurality of counter means, comparator means connected with said counter means, and digital-to-analog converter means connected with said DC restorer means;

signal combining means including delay means connected with said analog-to-digital converter means for delaying a received signal by one field time, and a combiner for receiving the output from said delay means and the received signal without delay; and output means connected with said signal combining means for providing a composite video signal output suitable for display of targets imaged by said pyroelectric videcon tube.

13. The system of claim 12 wherein said system includes automatic gain control means connected with said analog-to-digital converter means, said automatic gain control means being independent of said feedback means.

14. The system of claim 13 wherein said system includes processing amplifying means connected between said circular blanking means and said filter noise reduction means, and wherein said automatic gain control means includes counter means connected with said analog-to-digital converter means, window means connected with said counter means, up-down counter means connected with said window means, and digital-to-analog converter means connected with said counter means and providing an input to said processing amplifying means.

15. A method for compensating for level variations of pedestal components originating from a pyroelectric videcon tube of a pyroelectric camera, said method comprising:

forming a digital signal indicative of pedestal level variations;

digitally processing said formed digital signal to form a digital indication of said pedestal level variations and then converting said digital indication to an analog output indicative thereof; and utilizing said analog output to compensate for sensed variations of level variations of said pedestal components.

16. The method of claim 15 wherein said step of digitally processing said digital signal includes counting the least significant bits and most significant bits and comparing the same.

17. The method of claim 16 wherein said step of digitally processing said digital signal includes utilizing a counter for counting up and down in response to comparison of said least significant bits with said most significant bits.

18. The method of claim 17 wherein said method includes providing a DC restorer circuit unit and applying the output of said counter to said DC restorer circuit to enable said DC restorer circuit to cause compensation for sensed pedestal level variations.

* * * * *